United States Patent
Hur et al.

(10) Patent No.: US 8,179,482 B2
(45) Date of Patent: May 15, 2012

(54) TOUCH PANEL DISPLAY AND METHOD OF MANUFACTURING THE SAME

(75) Inventors: Seung-Hyun Hur, Cheonan-si (KR); Kweon-Sam Hong, Seoul (KR); Sang-Gun Choi, Suwon-si (KR); Hyun-Ho Kang, Ansan-si (KR); Jae-Yong Shin, Daegu (KR)

(73) Assignee: Samsung Electronics Co., Ltd. (KR)

( * ) Notice: Subject to any disclaimer, the term of this patent is extended or adjusted under 35 U.S.C. 154(b) by 628 days.

(21) Appl. No.: 12/357,281

(22) Filed: Jan. 21, 2009

(65) Prior Publication Data

US 2009/0237369 A1 Sep. 24, 2009

(30) Foreign Application Priority Data

Mar. 19, 2008 (KR) .................. 10-2008-0025536
Apr. 7, 2008 (KR) .................. 10-2008-0032206

(51) Int. Cl.
*G02F 1/1335* (2006.01)

(52) U.S. Cl. ............. 349/12; 345/104; 345/173; 345/87
(58) Field of Classification Search ................... 349/12; 345/104, 173, 87
See application file for complete search history.

(56) References Cited

U.S. PATENT DOCUMENTS

| | | | |
|---|---|---|---|
| 2004/0201786 A1* | 10/2004 | Park et al. | 349/12 |
| 2005/0052435 A1* | 3/2005 | Cho et al. | 345/182 |
| 2007/0013819 A1* | 1/2007 | Pak et al. | 349/12 |
| 2007/0152952 A1* | 7/2007 | Kang et al. | 345/102 |
| 2007/0195029 A1* | 8/2007 | Jeon et al. | 345/87 |
| 2008/0117182 A1* | 5/2008 | Um et al. | 345/173 |

\* cited by examiner

*Primary Examiner* — Huyen Ngo
(74) *Attorney, Agent, or Firm* — Innovation Counsel LLP

(57) ABSTRACT

A display having a touch panel capability is provided. The display includes a first substrate and a second substrate opposing each other, a thin-film transistor for pixel driving formed on the first substrate, and a thin-film transistor for touch position detection including a source electrode and a drain electrode formed on the first substrate, and a gate electrode formed on the second substrate.

17 Claims, 5 Drawing Sheets

TOUCH PANEL DISPLAY AND METHOD OF MANUFACTURING THE SAME

CROSS-REFERENCE TO RELATED APPLICATION

This application claims priority from Korean Patent Application No. 10-2008-0025536 filed on Mar. 19, 2008 and 10-2008-0032206 filed on Apr. 7, 2008 in the Korean Intellectual Property Office, the disclosure of which is incorporated herein by reference in its entirety.

BACKGROUND OF THE INVENTION

1. Field of the Invention

The present invention relates to a display, and more particularly, to a display having touch panel capabilities and to a method of manufacturing the display, in which the touch sensitivity of the display is improved.

2. Description of the Related Art

A touch panel is a device that can detect the position of touches within a display area of the touch panel so that a keyboard or a pointing device is not required. The user typically touches the display area using his or her fingers or a stylus. One type of conventional touch panel is that in which the touch panel is manufactured separately from a display before being combined with the same. However, the thickness of the display is increased through such a design. Hence, in an effort to overcome this problem of increased thickness, there have been proposed displays with an internally mounted touch panel, in which the displays are integrated with touch panel functionality during manufacture.

The two main types of such touch panel displays are the capacitive touch panel display and the resistive touch panel display. With the capacitive technology, changes to the normal capacitance of the touch panel are sensed to thereby detect the position of touches. With the resistive technology, the positions of touches are detected by sensing changes in resistance caused by the user pressing the touch panel. However, since writing is not possible with capacitive touch panel displays, resistive touch panel displays, which do allow writing, are more prevalent.

In a resistive touch panel display, sensing electrodes are formed on a lower substrate on which thin-film transistors and pixel electrodes are formed, while conductive spacers are formed on an upper substrate on which a color filter and common electrodes are formed. Areas where the conductive spacers and the sensing electrodes contact by pressing forces applied by the user are detected. However, due to the formation of an insulative alignment layer on opposing surfaces of the lower and upper substrates, the resistance between the conductive spacers of the upper substrate and the sensing electrodes of the lower substrate is increased. This leads to a reduction in sensitivity, as well as to differences in sensitivity in different areas of the touch panel display.

SUMMARY OF THE INVENTION

Aspects of the present invention provide a touch panel display which prevents a reduction in touch sensitivity, even after the formation of an alignment layer.

However, the aspects of the present invention are not restricted to the one set forth herein. The above and other aspects of the present invention will become more apparent to one of daily skill in the art to which the present invention pertains by referencing a detailed description of the present invention given below.

In the aspects of the present invention, a source electrode and a drain electrode for position detection are formed on a lower substrate, and a conductive spacer of an upper substrate operates as a gate electrode to thereby form a channel between the source and drain electrodes.

Further, in the aspects of the present invention, power is supplied to the source electrode for position detection from a gate line or a data line, and the drain electrode for position detection is connected to a sensing line.

According to an aspect of the present invention, there is provided a display including: a first substrate and a second substrate opposing each other; a thin-film transistor for pixel driving formed on the first substrate; and a thin-film transistor for touch position detection including a source electrode and a drain electrode formed on the first substrate, and a gate electrode formed on the second substrate.

The first substrate may further include: a gate line formed along one direction of the first substrate; a first sensing line formed along the same direction as and spaced apart from the gate line; a data line formed along another direction intersecting and insulated from the gate line; and a second sensing line formed along the same direction as and spaced apart from the data line.

The second sensing line may be formed to correspond to at least each unit pixel.

The thin-film transistor for touch position detection may include at least two thin-film transistors that use the gate electrode and the source electrode in common, and may further include at least two of the drain electrodes.

The source electrode may be connected to the gate line, and the drain electrodes are connected respectively to the first and second sensing lines.

The display may further include first and second sensing electrodes formed spaced apart in a region where the first and second sensing lines intersect.

The source electrode may be formed to extend from the first sensing electrode, and the drain electrodes may be formed to extend respectively from the second sensing line and the second sensing electrode.

The display may further include: a first connecting electrode which interconnects the first sensing electrode and the gate line; and a second connecting electrode which interconnects the second sensing electrode and the first sensing line.

The source electrode may be formed in a bent configuration.

The source electrode may be connected to the data line, and the drain electrodes may be connected respectively to the first and second sensing lines.

The display may further include a power line which supplies power to the source electrode.

The source electrode may be connected to the power line, and the drain electrodes may be connected respectively to the first and second sensing lines.

The gate electrode may be a conductive spacer.

The conductive spacer may be formed opposing the source electrode and the drain electrode.

According to another aspect of the present invention, there is provided a display including: a first substrate and a second substrate opposing each other; a gate line and a first sensing line formed spaced apart on the first substrate along one direction; a data line and a second sensing line formed spaced apart on the first substrate along another direction intersecting the gate line; a pixel electrode formed in proximity to the gate line and the data line; a thin-film transistor for pixel driving connected to the gate line, the data line, and the pixel electrode; and a thin-film transistor for touch position detection connected to a power line and the first and second sensing lines, and which is driven by a conductive spacer of the second substrate.

The power line may include one of the gate line and the data line.

The thin-film transistor for touch position detection may include: a first thin-film transistor having a source electrode connected to the power line, a drain electrode connected to the first sensing line, and the conductive spacer operating as a gate electrode; and a second thin-film transistor comprising a source electrode connected to the power line, a drain electrode connected to the second sensing line, and the conductive spacer operating as a gate electrode.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EXEMPLARY EMBODIMENTS

The invention will now be described more fully hereinafter with reference to the accompanying drawings, in which exemplary embodiments of the present invention are illustrated. The invention may, however, be embodied in different forms and should not be construed as limited to the embodiments set forth herein. Rather, these embodiments are provided so that this disclosure will be thorough and complete, and will fully convey the scope of the present invention to those skilled in the art.

Example embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, may be expected. Thus, the disclosed example embodiments of the invention should not be construed as limited to the particular shapes of regions illustrated herein unless expressly so defined herein, but are to include deviations in shapes that result, for example, from manufacturing. Thus, the regions illustrated in the figures are schematic in nature and their shapes are not intended to illustrate the actual shape of a region of a device and are not intended to limit the scope of the invention, unless expressly so defined herein.

Furthermore, relative terms such as "below," "beneath," or "lower," "above," and "upper" may be used herein to describe one element's relationship to another element as illustrated in the accompanying drawings. It will be understood that relative terms are intended to encompass different orientations of the device in addition to the orientation depicted in the accompanying drawings. For example, if the device in the accompanying drawings is turned over, elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the exemplary terms "below" and "beneath" can, therefore, encompass both an orientation of above and below.

Figure 1:
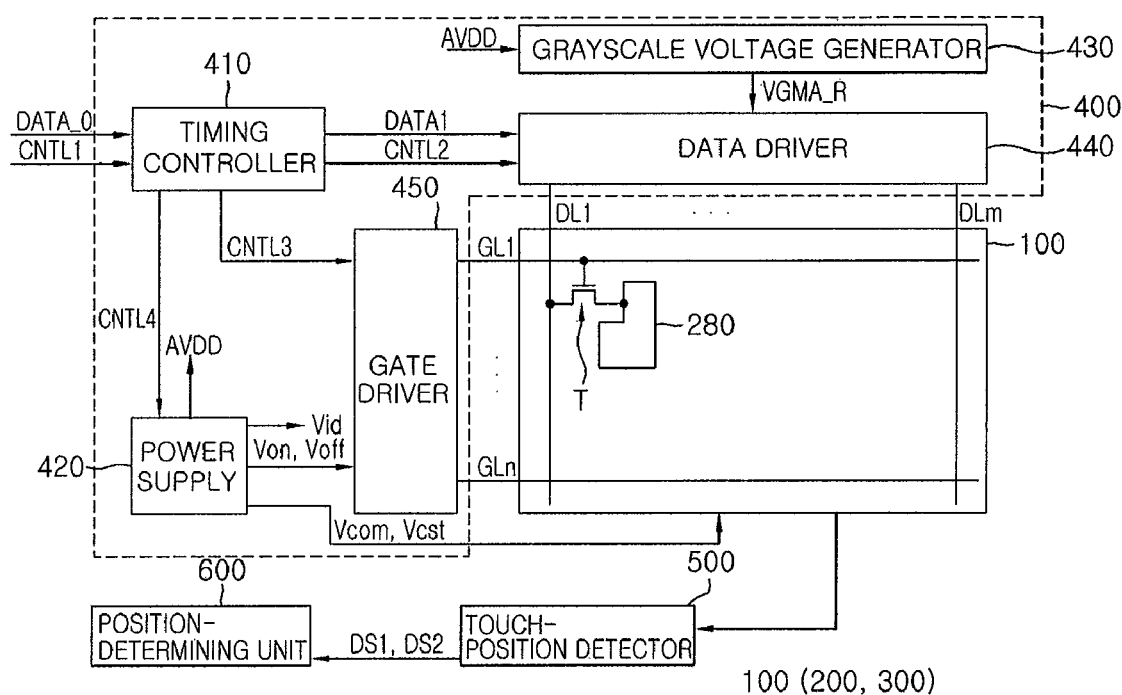
FIG. 1 is a schematic block diagram of a touch panel display according to an embodiment of the present invention.

FIG. 1 is a schematic block diagram of a touch panel display according to an embodiment of the present invention.

Referring to FIG. 1, a display according to an embodiment of the present invention includes a display panel 100, a panel driver 400, a touch-position detector 500, and a position-determining unit 600.

The display panel 100 includes a lower substrate 200 on which there are formed thin-film transistors for pixel driving, pixel electrodes, sensing lines, and source electrodes and drain electrodes for position detection, and an upper substrate 300 on which there are formed a color filter, common electrodes, and conductive spacers. The display panel 100 further includes a liquid crystal layer (not shown) formed between the lower substrate 200 and the upper substrate 300. In the present invention, the upper substrate 300 and the lower substrate 200 may be referred to respectively as a second substrate and a first substrate, or alternatively, respectively as a first substrate and a second substrate.

A plurality of gate lines (GL1 to GLn) extending along one direction and a plurality of data lines (DL1 to DLm) extending along another direction are formed on the lower substrate 200. Pixels are formed at areas where the plurality of gate lines (GL1 to GLn) and the plurality of data lines (DL1 to DLm) intersect. Further, formed respectively in the pixels are thin-film transistors T, which are switching elements used for pixel driving, and pixel electrodes 280. Each thin-film transistor T is formed of a gate electrode, a source electrode, and a drain electrode, in which the gate electrode is connected to one of the gate lines GL, the source electrode is connected to one of the data lines DL, and the drain electrode is connected to one of the pixel electrodes 280. Additionally, a plurality of first sensing lines (not shown) and a plurality of second sensing lines (not shown), which perform a touch-panel function, are formed on the lower substrate 200. The first sensing lines may extend along the same direction as the gate lines GL and the second sensing lines may extend along the same direction as the data lines DL, such that the first sensing lines intersect the second sensing lines. The first sensing lines are electrically insulated from the second sensing lines. The first and second sensing lines are connected to the touch-position detector 500. The first and second sensing lines may be formed in each unit pixel, which includes red (R), green (G), and blue (B) sub pixels, or may be formed in each sub pixel, or formed spaced apart at predetermined intervals. Moreover, source electrodes (not shown), which are used for position detection and which are connected to the gate lines GL and the data lines DL, and drain electrodes (not shown), which are also used for position detection and which are connected to the first and second sensing lines, may be formed on the lower substrate 200. One source electrode and one drain electrode for position detection may be formed in each unit pixel, such as in the blue (B) sub pixel thereof. Further, an alignment layer (not shown) for adjusting the alignment of liquid crystal may be formed on the lower substrate 200.

A color filter and common electrodes are formed on the upper substrate 300. The upper substrate 300 is disposed opposing the lower substrate 200 and is joined with the lower substrate 200 in such a manner as to interpose a liquid crystal layer (not shown) therebetween. The upper substrate 300 may be formed as a color filter substrate that includes color filters corresponding respectively to the pixels. Alternatively, a color filter may be formed on the lower substrate 200. Further, a plurality of conductive spacers (not shown) for performing a touch panel function are formed on the upper substrate 300. One conductive spacer may be formed in each unit pixel or in each sub pixel. Moreover, an alignment layer (not shown) for aligning liquid crystals may be formed on the upper substrate 300.

The conductive spacers of the upper substrate 300 operate as gate electrodes for position detection. Accordingly, the conductive spacers of the upper substrate 300 and source and drain electrodes for position detection of the lower substrate 200 form thin-film transistors for position detection. With this configuration, if one of the conductive spacers contacts a corresponding source electrode and a corresponding drain electrode for position detection of the lower substrate 200, the conductive spacer forms a channel between the source electrode and the drain electrode, and a current flows from the source electrode for position detection to the drain electrode for position detection. Since the drain electrode for position detection is connected to the first and second sensing lines, the position of the corresponding thin-film transistor for position detection, which is turned on at this time, is detected.

The panel driver 400 includes a timing controller 410, a power supply 420, a grayscale voltage generator 430, a data driver 440, and a gate driver 450.

The timing controller 410 controls the overall operation of the display. The timing controller 410 outputs a first data signal DATA1, a second control signal CNTL2, a third control signal CNTL3, and a fourth control signal CNTL4, which are used for displaying an image on the display panel 100, in accordance with the input of an R, G, B primitive data signal DATA_0 and a first control signal CNTL1 from a host system (not shown), such as a graphics controller (not shown). The first control signal CNTL1 includes a main clock signal MCLK, a horizontal synchronization signal HSYNC, and a vertical synchronization signal VSYNC. The second control signal CNTL2 includes a horizontal start signal STH, a reverse signal REV, and a data load signal TP for controlling the data driver 440. The third control signal CNTL3 includes an initiation signal STV, a clock signal CK, and an output enable signal OE for controlling the gate driver 450. The fourth control signal CNTL4 includes a clock signal CLK and a reverse signal REV for controlling the power supply 420. The timing controller 410 provides the R', G', B' first data signal DATA1, which is the primitive data signal DATA_0 with its output timing controlled, to the data driver 440.

The power supply 420, in response to the fourth control signal CNTL4 output by the timing controller 410, outputs common voltages Vcom, Vcst to the display panel 100, an initial drive voltage Vid to the lower substrate for performing a touch screen function, an analog drive voltage AVDD to the grayscale voltage generator 430, and a gate on voltage Von and a gate off voltage Voff to the gate driver 450.

The grayscale voltage generator 430 uses the analog drive voltage AVDD supplied by the power supply 420 as a reference voltage and outputs a plurality of reference grayscale voltages VGMA_R corresponding to the number of grayscale levels on the basis of distribution resistors having resistance ratios to which a gamma curve is applied.

The data driver 440 generates a grayscale voltage VGMA (not shown) on the basis of the reference grayscale voltages VGMA_R output by the grayscale voltage generator 430. Further, the data driver 440, on the basis of the second control signal CNTL2 input from the timing controller 410 and the grayscale voltage VGMA, converts the digital first data signal DATA1, which is provided in line units, into a data signal, controls an output timing of the data signal, and outputs the resulting data signal to the data lines (DL1 to DLm).

The gate driver 450 generates a gate signal according to the third control signal CNTL3 output by the timing controller 410 and the gate on and off voltages Von, Voff output by the power supply 420, and sequentially outputs the gate signal to the gate lines (GL1 to GLn).

The touch-position detector 500 detects position coordinates of the position where an external pressure is applied to the display panel 100, i.e., the position of a thin-film transistor for position detection that has been turned on, and outputs a first detection signal DS1 and a second detection signal DS2.

The position-determining unit 600 combines x-axis and y-axis coordinates determined respectively from the first and second detection signals DS1, DS2 output by the touch-position detector 500, and thereby determines the position on the display panel 100 where the external pressure is being applied.

Figure 2:
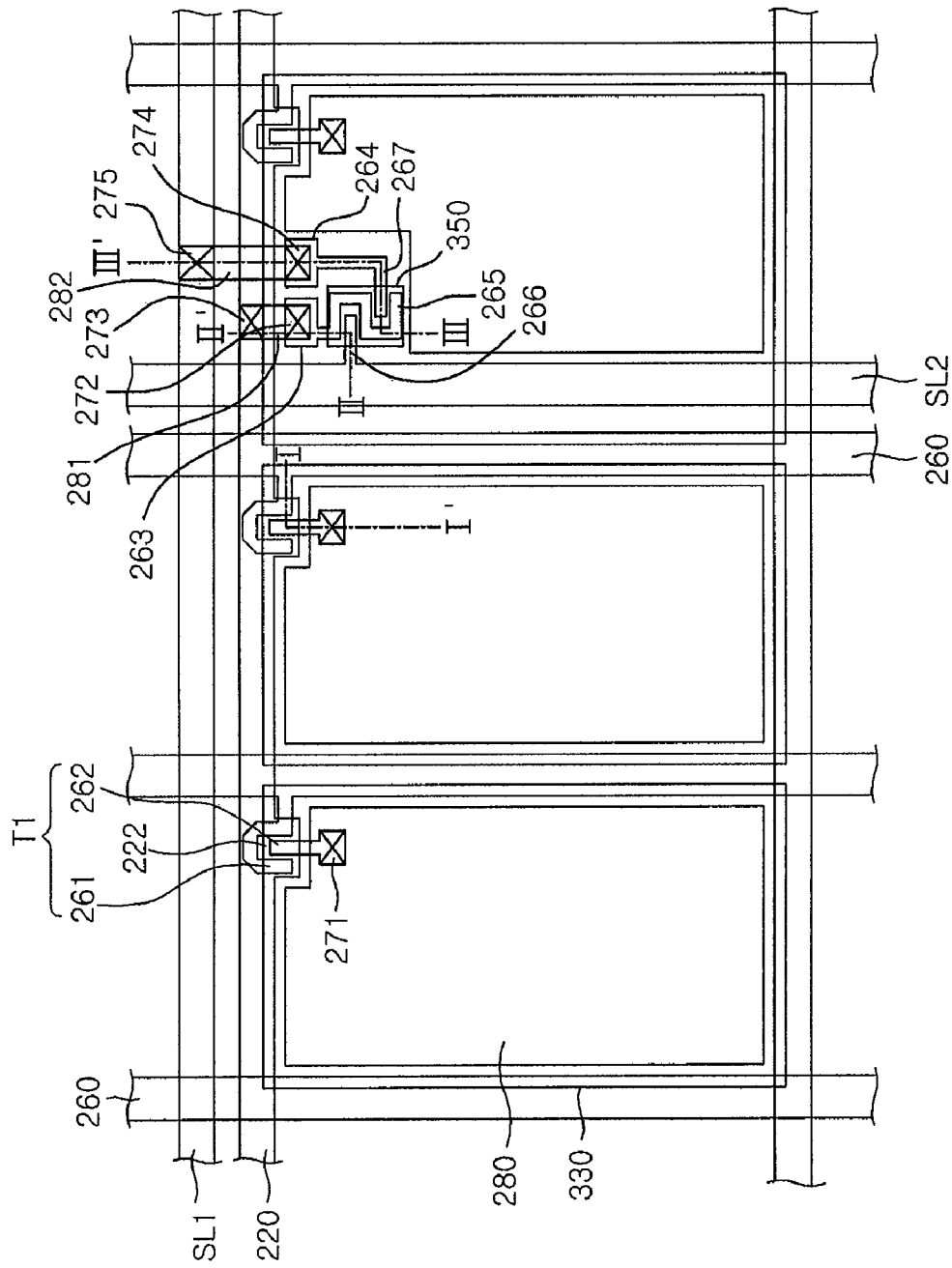
FIG. 2 is a plan view of a display panel according to an embodiment of the present invention.
Figure 3:
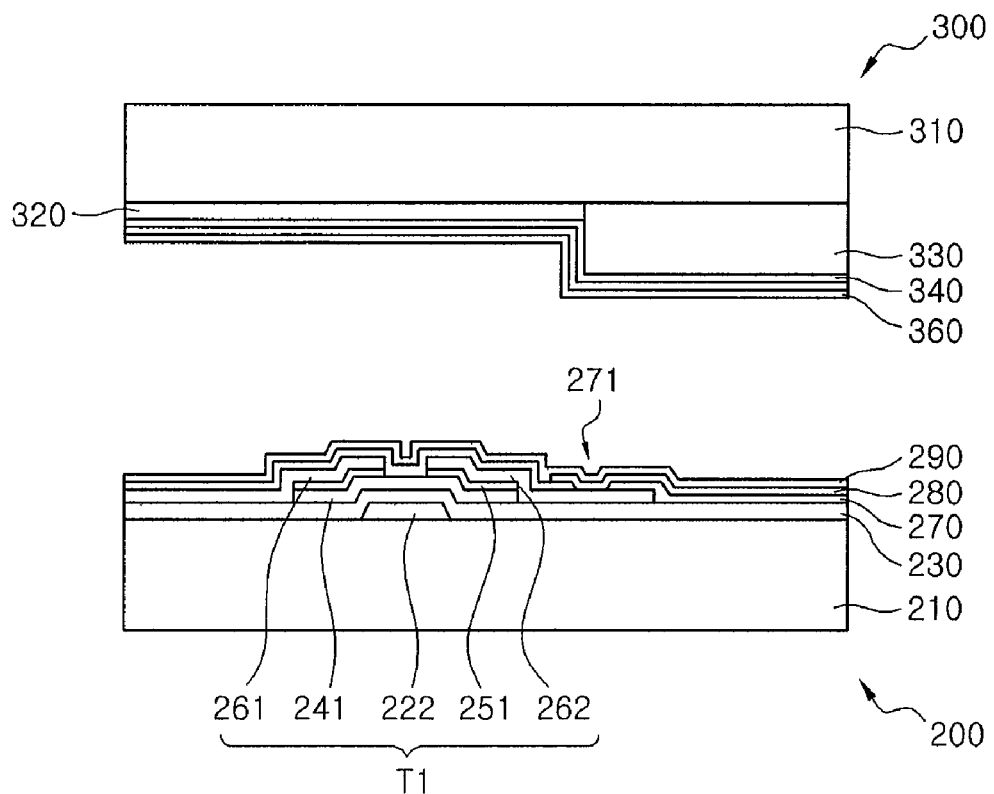
FIG. 3 is a sectional view taken along line I-I' of FIG. 2.
Figure 4:
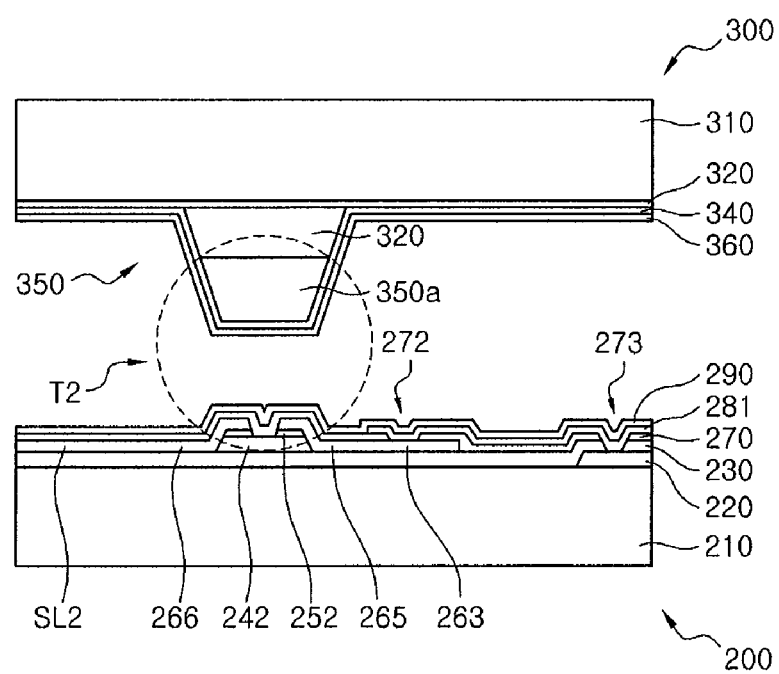
FIG. 4 is a sectional view taken along line II-II' of FIG. 2.
Figure 5:
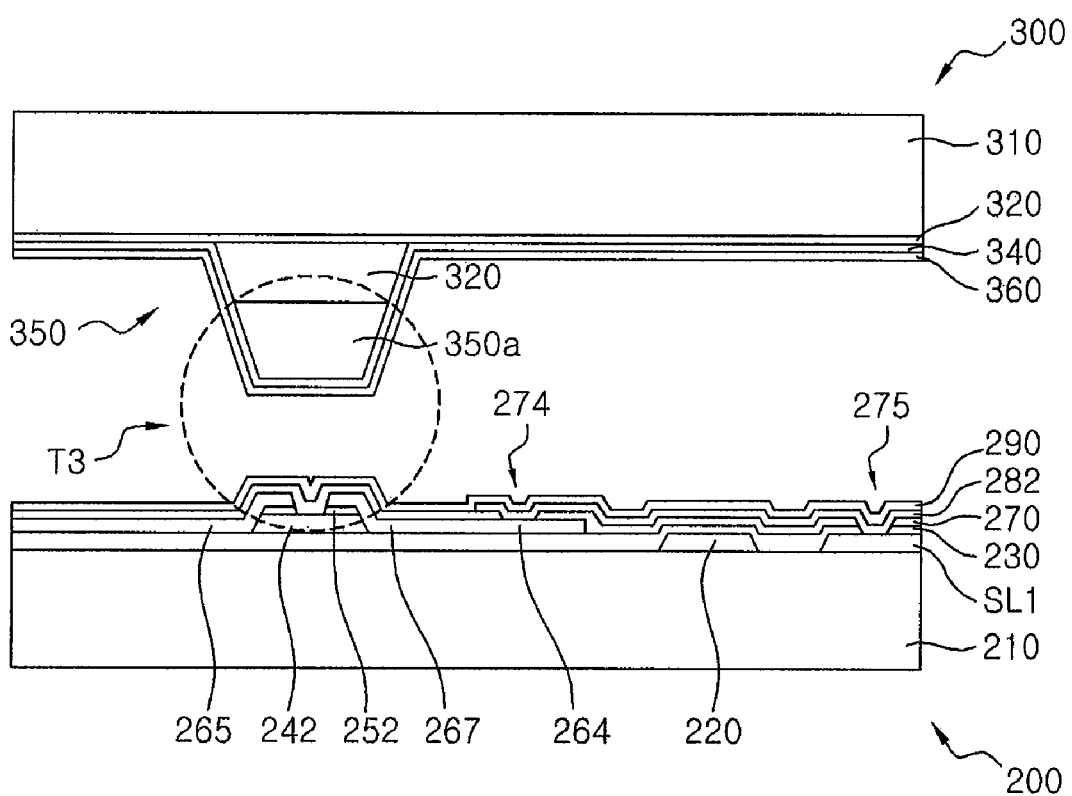
FIG. 5 is a sectional view taken along line III-III' of FIG. 2.

FIG. 2 is a plan view of a display panel with integrated touch panel functionality according to an embodiment of the present invention, FIG. 3 is a sectional view taken along line I-I' of FIG. 2, FIG. 4 is a sectional view taken along line II-II' of FIG. 2, and FIG. 5 is a sectional view taken along line III-III' of FIG. 2. In this embodiment, an example is described by which one conductive spacer, one source electrode for position detection, and one drain electrode for position detection are formed in each unit pixel, and each unit pixel is realized by a combination of a red (R) sub-pixel, a green (G) sub-pixel, and a blue (B) sub-pixel. Further, in this embodiment, the conductive spacer, and the source electrode and drain electrode for position detection are formed in the pixel region of the blue (B) sub-pixel.

With reference to FIGS. 2, 3, 4, and 5, the display panel 100 according to an embodiment of the present invention includes a lower substrate 200 and an upper substrate 300 opposing one another, and a liquid crystal layer (not shown) interposed between the lower substrate 200 and the upper substrate 300.

The lower substrate 200 includes a plurality of gate lines 220 extending along one direction on a first insulation substrate 210, a plurality of data lines 260 extending along another direction to intersect the gate lines 220, pixel electrodes 280 formed in sub-pixel regions defined by the gate lines 220 and the data lines 260, and thin-film transistors T1 for panel driving (hereinafter referred to as first thin-film transistors) connected to the gate lines 220, the data lines 260, and the pixel electrodes 280. In this embodiment, the first thin-film transistors T1 are respectively formed in the sub-pixels, and are bottom gate-type thin-film transistors in which first gate electrodes 222 are formed under first source electrodes 261 and first drain electrodes 262. The lower substrate 200 further includes first sensing lines SL1 extending along the one direction spaced apart from the gate lines 220, and second sensing lines SL2 extending along the another direction spaced apart from the data lines 260. The lower substrate 200 additionally includes a plurality of pairs of spaced-apart first and second sensing electrodes 263, 264, each pair being formed in one sub-pixel region of one of the unit pixels, second source electrodes 265 branched respectively from the first sensing electrodes 263, second drain electrodes 266 branched respectively from the second sensing lines SL2, and third drain electrodes 267 branched respectively from the second sensing lines SL2. Moreover, the lower substrate 200 includes first connecting electrodes 281 interconnecting the gate lines 220 and the first sensing electrodes 263, and second connecting electrodes 282 interconnecting the first sensing lines SL1 and the second sensing electrodes 264.

As an example, the gate lines 220 may extend along the horizontal direction, and a portion of the gate lines 220 may protrude to form the first gate electrodes 222. Further, the first sensing lines SL1 are formed extending along the same direction as the gate lines 220 and spaced apart from the gate lines 220 by a predetermined distance. In addition, sustain electrode lines (not shown) may be formed spaced apart respectively from the gate lines 220 and the first sensing lines SL1. Preferably, the gate lines 220, the first sensing lines SL1, and the sustain electrode lines (not shown) are formed on the same layer, and are formed by the same process.

A gate insulation layer 230 is formed over the entire surface of the lower substrate 200, including over the gate lines 220. The gate insulation layer 230 may be formed as a single layer or as multiple layers using silicon dioxide ($SiO_2$) or silicon nitride ($SiN_x$).

First active layers 241, which are formed of a semiconductor material such as amorphous silicon, are formed on the gate insulation layer 230 respectively over the gate electrodes 222. First ohmic contact layers 251, which are made of a semiconductor material such as silicide or n+ hydrogenated amorphous silicon which is heavily doped with n-type impurities, are formed on the first active layers 241. A portion of each of the first ohmic contact layers 251 at a first channel portion between the corresponding first source electrode 261 and corresponding first drain electrode 262 may be removed. In addition, a second active layer 242 is formed on a predetermined region of the gate insulation layer 230 in a sub-pixel, e.g., a blue (B) sub-pixel, of each unit pixel, and a second ohmic contact layer 252 is formed on the second active layer 242. The second active layers 242 are made by the same process as the first active layers 241, and the second ohmic contact layers 252 are made by the same process as the first ohmic contact layers 251. Additionally, for each of the second ohmic contact layers 252, there may be removed portions thereof at a second channel portion between the corresponding second source electrode 265 and the corresponding second drain electrode 266 may be removed, and at a third channel portion between the corresponding second source electrode 265 and the corresponding third drain electrode 267 may be removed.

The data lines 260 are formed on the gate insulation layer 230 along another direction, i.e., vertical direction, intersecting the gate lines 220 and the first sensing lines SL1. Sub-pixel regions are defined by the intersection of the data lines 260 and the gate lines 220. The first source electrodes 261 are formed extending from the data lines 260 over the first ohmic contact layers 251, and the first drain electrodes 262 are formed spaced apart from the first source electrodes 261 on the first ohmic contact layers 251. In addition, the second sensing lines SL2 are formed spaced apart from the data lines 260 and along the same direction as the data lines 260. Each of the unit pixels, e.g., the blue (B) sub-pixel region thereof, has one of the second sensing lines SL2 extending therethrough.

During formation of the data lines 260 and the second sensing lines SL2, the first and second sensing electrodes 263, 264 are formed spaced apart in the blue (B) sub-pixel region. Moreover, the second source electrodes 265 for position detection (hereinafter referred to as simply "second source electrodes") are formed branched from the first sensing electrodes 263, the second drain electrodes 266 for position detection (hereinafter referred to as simply "second drain electrodes") are formed branched from the second sensing lines SL2, and the third drain electrodes 267 for position detection (hereinafter referred to as simply "third drain electrodes") are formed branched from the second sensing electrodes 264.

Each of the second source electrodes 265 is formed in a predetermined bent configuration, for example, a configuration having a rightwardly extending portion, a first downwardly extending portion, a leftwardly extending portion, a second downwardly extending portion, and a second rightwardly extending portion. With this formation, the rightwardly extending portion, the first downwardly extending portion, and the leftwardly extending portion form an leftwardly opened first space, and the leftwardly extending portion, the second downwardly extending portion, and the second rightwardly extending portion form a rightwardly opened second space. Preferably, one or more first space and one or more second space are formed. The second drain electrodes 266 are formed in the leftwardly opened first spaces and spaced apart from the source electrodes 265, and the third drain electrodes 267 are formed in the rightwardly opened second spaces and spaced apart from the source electrodes 265. The second channel portions are formed by the second active layers 242 in the regions between the second source electrodes 265 and the second drain electrodes 266, and the third channel portions are formed by the second active layers 242 in the regions between the second source electrodes 265 and the third drain electrodes 267.

A protection layer 270 is formed over the entire surface of the lower substrate 200, including over the gate lines 220 and the data lines 260. The protection layer 270 may be formed of an inorganic insulation layer or an organic insulation layer, and may be formed to a thickness of approximately 1000 Å. Further, predetermined regions of the protection layer 270 are removed to form a plurality of contact holes. That is, formed in the protection layer 270 are first contact holes 271 that expose a portion of the first drain electrodes 262, second contact holes 272 that expose a portion of the first sensing electrodes 263, third contact holes 273 that expose a portion of the gate lines 220, fourth contact holes 274 that expose a portion of the second sensing electrodes 264, and fifth contact holes 275 that expose a portion of the first sensing lines SL1. The third contact holes 273 and the fifth contact holes 275 extend through the gate insulation layer 230 so as to expose the gate lines 220 and the first sensing lines SL1.

The pixel electrodes 280 are formed on the protection layer 270. The pixel electrodes 280 are formed of a transparent conductive material such as ITO (indium tin oxide) or IZO (indium zinc oxide). The pixel electrodes 280 are connected to the first drain electrodes 262 through the first contact holes 271. Further, during formation of the pixel electrodes 280, the first connecting electrodes 281 and the second connecting electrodes 282 are formed spaced apart from the pixel electrodes 280. The first connecting electrodes 281 are formed connected to the first sensing electrodes 263 and the gate lines 220 respectively through the second and third contact holes 272, 273. The second connecting electrodes 282 are formed connected to the second sensing electrodes 264 and the first sensing lines SL1 respectively through the fourth and fifth contact holes 274, 275.

A first alignment layer 290 for adjusting the alignment of liquid crystals is formed over the entire surface of the lower substrate 200, including over the pixel electrodes 280, the first connecting electrodes 281, and the second connecting electrodes 282. The first alignment layer 290 is formed to a thickness of approximately 1000 Å, and is made of polyimide.

The upper substrate 300 includes a black matrix 320 formed on a second insulating layer 310, color filters 330, and common electrodes 340. The upper substrate 300 further includes conductive spacers 350.

The black matrix 320 is formed in regions outside the sub pixels. As an example, the black matrix 320 is formed on the upper substrate 300 at areas thereof opposing the gate lines 221, the data lines 260, the first thin-film transistors T1, the first and second sensing lines SL1, SL2, the first and second sensing electrodes 263, 264, the second source electrodes 265, and the second and third drain electrodes 266, 267 of the lower substrate 200. The black matrix 320 prevents light from being directed toward areas outside the sub-pixel regions, and prevents light interference between adjacent sub-pixel regions. The black matrix 320 is made of a photosensitive organic material with a black pigment added thereto. Carbon black or titanium oxide is used for the black pigment.

The color filters 330 are formed by repeatedly forming a pattern of red (R), green (G), and blue (B) filters. The black matrix 320 is used as a boundary inside of which the color filters 330 are formed. The color filters 330 provide color tones to light passing through the liquid crystal layer (not shown) from a light source. The color filters 330 are formed of a photosensitive organic material.

One of the conductive spacers 350 is formed for each unit pixel. As an example, each conductive spacer 350 is formed on a blue color pixel 330 which is located in the blue sub pixel of a corresponding unit pixel, and in an area opposing a region of the lower substrate 200 that includes a portion of the corresponding second source electrodes 265 and the corresponding second and third drain electrodes 266, 267. In this case, the black matrix 320 is formed under the blue color filters 330 where the conductive spacers 350 are formed. However, the conductive spacers 350 are formed over areas where the second source electrodes 265 overlap part of the second active layers 242, and over areas where the second and third drain electrodes 266, 267 overlap part of the second active layers 242. Accordingly, the conductive spacers 350 are formed in regions of the upper substrate 300 opposing the second active layers 242 of the lower substrate 200. Further, the conductive spacers 350 may be formed corresponding to the shape of the second active layers 242. For example, the conductive spacers 350 may be rectangular in shape. However, the conductive spacers 350 are not limited in this respect and may be formed in a variety of shapes in regions opposing the second active layers 242. The conductive spacers 350 are formed by first forming columnar spacers 350a using an insulative material following the formation of the color filters 330, after which the common electrodes 340 are formed on the spacers 350a. Alternatively, each of the conductive spacers 350 may be formed by stacking a plurality of color filters 330, performing patterning, and forming the corresponding common electrode 340 on the plurality of stacked color filters 330.

The common electrodes 340 are formed of a transparent conductive material such as ITO (indium tin oxide) or IZO (indium zinc oxide), and are formed on the insulation substrate 310 over the black matrix 320 and the color filters 330.

A second alignment layer 360 for adjusting the alignment of liquid crystals is formed on the common electrodes 340. The second alignment layer 360 is formed to a thickness of approximately 1000 Å, and is made of polyimide.

In the display panel 100 with integrated touch panel functionality according to an embodiment of the present invention and structured as described above, second thin-film transistors T2 for position-detection (hereinafter referred to as simply "second thin-film transistors") and third thin-film transistor T3 for position detection (hereinafter referred to as simply "third thin-film transistors) are formed to detect the position of touches. The second thin-film transistors T2 include the second source electrodes 265 and the second drain electrodes 266 which are formed on the lower substrate 200, and the third thin-film transistors T3 include the second source electrodes 265 and the third drain electrodes 267 which are formed on the lower substrate 200. That is, the second and third thin-film transistors T2, T3 are formed using the second source electrodes 265 as common electrodes, and further including the second and third drain electrodes 266, 267, respectively. Further, the conductive spacers 350 formed on the upper substrate 300 function as gate electrodes of the second and third thin-film transistors T2, T3. Accordingly, the second and third thin-film transistors T2, T3 are top gate-type thin-film transistors, in which the gate electrodes are formed on the source and drain electrodes.

The second and third thin-film transistors T2, T3 are structured such that an electric field is not formed between the source electrodes 265 and the second and third drain electrodes 266, 267 when the gate electrodes, i.e., the conductive spacers 350 are at a normal position. However, when the upper substrate 300 and the lower substrate 200 contact each other by a touch operation, an electric field is applied to the lower substrate 200 by the conductive spacers 350, and, as a result, channels are formed between the second source electrodes 265 and the second and third drain electrodes 266, 267. During such a touch operation, although the protection layer 270, the first alignment layer 290, and the second alignment layer 390 are disposed and function as gate insulation layers between the conductive spacers 350 and the second source electrodes 265 and the second and third drain electrodes 266, 267, since the total thickness of the protection layer 270, the first alignment layer 290, and the second alignment layer 390 is approximately 3000 Å, no problems are encountered with respect to forming the channels. To provide an example, electric fields are formed in the first thin-film transistors T1 when the gate insulation layers 230 thereof are formed to approximately 4000 Å, and so a thickness of 3000 Å for the above-described elements of the second and third thin-film transistors T2, T3 poses no problems with respect to the formation of electric fields.

Accordingly, current from the gate lines 220 is supplied to the second sensing lines SL2 through the second source electrodes 265 and the second drain electrodes 266, and is supplied to the first sensing lines SL1 through the second source electrodes 265 and the third drain electrodes 267. Hence, the touch-position detector 500 of FIG. 1, which is connected to the first sensing lines SL1 and the second sensing lines SL2, detects the position at which an external pressure has been applied, and outputs a detection signal. The detection signal is received by the position-determining unit 600 which then determines the touch position. A common voltage of approximately in the range of 0 to 15V may be applied to the common electrodes 340 of the upper substrate 300, and a gate-off voltage may be applied to the second source electrodes 265 of the lower substrate 200 such that a voltage difference of approximately 13~14V is generated with the common voltage. For example, a common voltage of approximately 6.5V may be applied to the common electrodes 340 of the upper substrate 300, and a gate-off voltage of approximately −7.5V may be applied to the second source electrodes 265 which are connected to the gate lines 220 of the lower substrate 200. Accordingly, in this case, a voltage difference of approximately 14V is generated between the conductive spacers 350 and the source electrodes 265 such that a voltage difference of approximately 14V is created between the conductive spacers 350 and the second source electrodes 265, thereby allowing the conductive spacers 350 to sufficiently operate as gate electrodes.

In the above embodiment, although the second source electrodes 265 are described as being connected to the gate lines 220 via the first sensing electrodes 263, in other embodiments, the second source electrodes 263 may be connected to the data lines 260. With this alternative configuration, the second source electrodes 263 may be branched from the data lines 260. Further, other power lines may be formed with the gate lines 220 or the data lines 260, and the second source electrodes 263 may be connected to the power lines.

Figure 6:
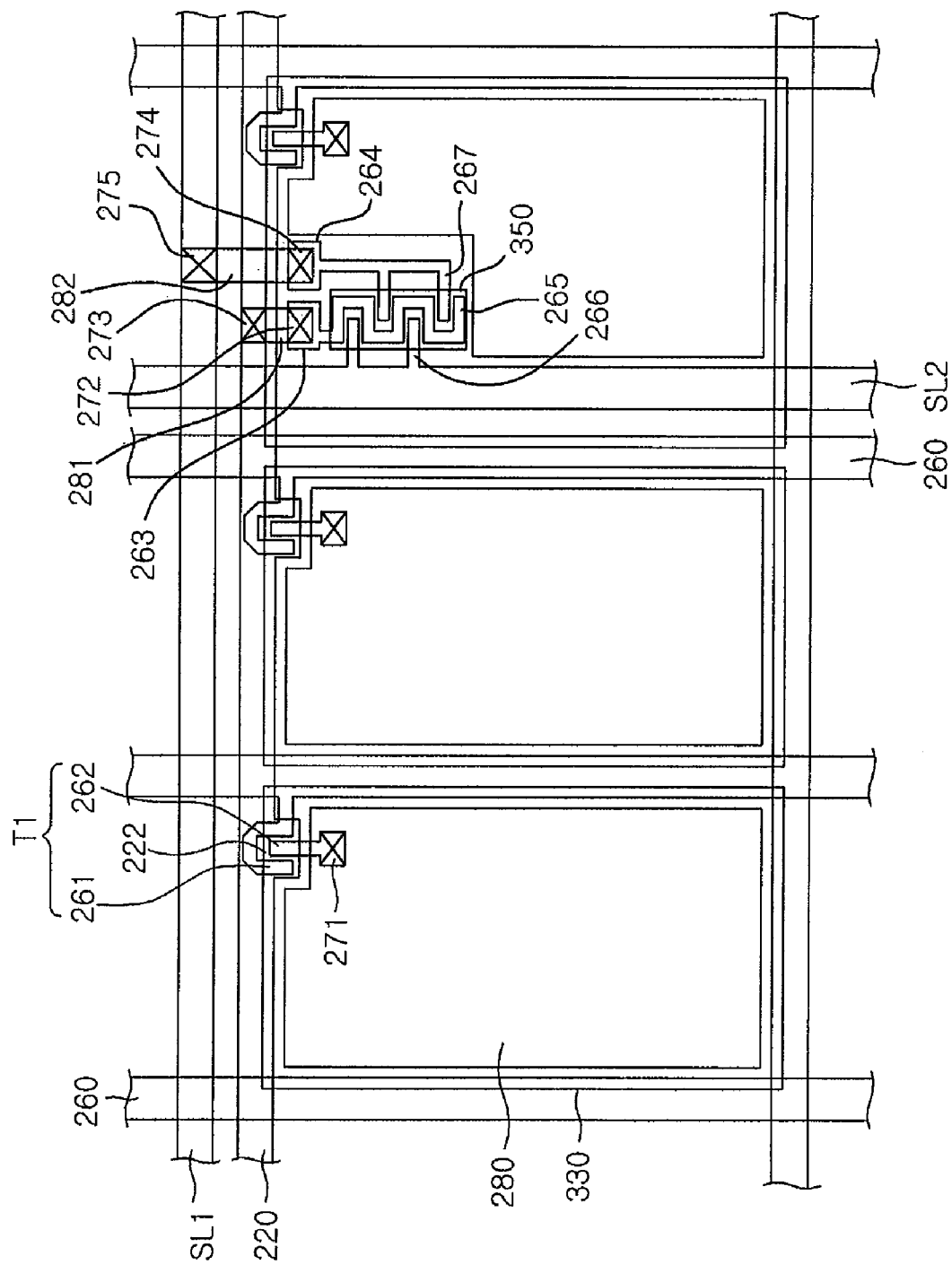
FIG. 6 is a plan view of a touch panel display according to another embodiment of the present invention.

In order to increase the widths of the second and third channels between the second source electrodes 265 and the second and third drain electrodes 266, 267, the number of bends of the second source electrodes 265 is increased and a plurality of the second and third drain electrodes 266, 267 are formed. That is, in another embodiment as shown in FIG. 6, each of the second source electrodes 265 is formed in a predetermined, repeated bent configuration having a rightwardly extending portion, a downwardly extending portion, a leftwardly extending portion, another downwardly extending portion, and another rightwardly extending portion. Accordingly, there are formed two or more leftwardly opened first spaces by one rightwardly extending portion, one downwardly extending portion, and one leftwardly extending portion, and two or more rightwardly opened second spaces by one leftwardly extending portion, one downwardly extending portion, and one rightwardly extending portion. The second drain electrodes 266 are branched from the second sensing lines SL2 and are disposed respectively in the leftwardly opened first spaces in a state spaced apart from the second source electrode 265, and the third drain electrodes 267 are branched from the second sensing electrodes 264 and are disposed in the rightwardly opened second spaces in a state spaced apart from the second source electrode 265. However, if the second source electrodes 265 are formed in a bent configuration that includes many of the first and second spaces, while the touch sensitivity may be increased due to the large current flowing through the second and third drain electrodes 266, 267, the aperture ratio is decreased. Hence, the second source electrodes 265 are preferably formed including as many bends as possible but to not an extent that the aperture ratio is diminished.

The display that detects the position of touches using transistors formed on the upper substrate and the lower substrate may be applied to various different types of display configurations, in addition to LCDs.

In the present invention, source electrodes and drain electrodes for position detection are formed on the lower substrate, and the conductive spacers of the upper substrate operate as gate electrodes to thereby form thin-film transistors for position detection. Further, the source electrodes for position detection are connected to the gate lines or data lines of the lower substrate to thereby be supplied with power, and the drain electrodes for position detection are connected to the first and second sensing lines. With this configuration, when the conductive spacers of the upper substrate reach the upper portions of the source and drain electrodes for position detection as a result of a touch operation, channels are formed between the source electrodes and the drain electrodes by the conductive spacers, and current flows from the source electrodes to the drain electrodes. Touch position is ultimately detected through such an operation.

Accordingly, it is possible to overcome the problems associated with the conventional resistive touch panel display in which resistance is increased due to the alignment layer such that touch sensitivity is decreased and the sensitivity of different locations are not same. Hence, the drawbacks of a reduction in touch sensitivity and variances in sensitivity for different locations of the display due to the alignment layer are overcome by the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

That which is claimed is:

1. A display comprising:
    a first substrate and a second substrate opposing each other;
    a thin-film transistor for pixel driving formed on the first substrate; and
    a thin-film transistor for touch position detection including a semiconductor layer, a source electrode and a drain electrode formed on the first substrate, and a gate electrode formed on the second substrate.

2. The display of claim 1, wherein the first substrate further comprises:
    a gate line formed along one direction of the first substrate;
    a first sensing line formed along the same direction as and spaced apart from the gate line;
    a data line formed along another direction intersecting and insulated from the gate line; and
    a second sensing line formed along the same direction as and spaced apart from the data line.

3. The display of claim 2, wherein the second sensing line is formed corresponding to at least each unit pixel.

4. The display of claim 2, wherein the thin-film transistor for touch position detection comprises at least two thin-film transistors that use the gate electrode and the source electrode in common and has at least two of the drain electrodes.

5. The display of claim 4, wherein the source electrode is connected to the gate line, and the drain electrodes are connected respectively to the first and second sensing lines.

6. The display of claim 5, further comprising first and second sensing electrodes formed spaced apart in a region where the first and second sensing lines intersect.

7. The display of claim 6, wherein the source electrode is formed extending from the first sensing electrode, and the drain electrodes are formed extending respectively from the second sensing line and the second sensing electrode.

8. The display of claim 7, further comprising:
    a first connecting electrode which interconnects the first sensing electrode and the gate line; and
    a second connecting electrode which interconnects the second sensing electrode and the first sensing line.

9. The display of claim 7, wherein the source electrode is formed in a bent configuration.

10. The display of claim 4, wherein the source electrode is connected to the data line, and the drain electrodes are connected respectively to the first and second sensing lines.

11. The display of claim 1, wherein the source electrode is connected to a power line, and the drain electrodes are connected respectively to the first and second sensing lines.

12. The display of claim 1, where the gate electrode is a conductive spacer.

13. The display of claim 12, wherein a common voltage substantially in the range of 0 to 15V is applied to the conductive spacer.

14. The display of claim 12, wherein the conductive spacer is formed opposing the source electrode and the drain electrode.

15. A display comprising:
    a first substrate and a second substrate opposing each other;
    a gate line and a first sensing line formed spaced apart on the first substrate along one direction;

a data line and a second sensing line formed spaced apart on the first substrate along another direction intersecting the gate line;

a pixel electrode formed in proximity to the gate line and the data line;

a thin-film transistor for pixel driving connected to the gate line, the data line, and the pixel electrode; and a thin-film transistor for touch position detection connected to a power line and the first and second sensing lines, and which is driven by a conductive spacer on the second substrate, wherein the thin-film transistor for touch position detection includes a semiconductor layer on the first substrate.

16. The display of claim 15, wherein the power line comprises one of the gate line and the data line.

17. The display of claim 16, wherein the thin-film transistor for touch position detection comprises:

a first thin-film transistor comprising a source electrode connected to the power line, a drain electrode connected to the first sensing line, and the conductive spacer operating as a gate electrode; and a second thin-film transistor comprising a source electrode connected to the power line, a drain electrode connected to the second sensing line, and the conductive spacer operating as agate electrode.

* * * * *